United States Patent
Squicciarini

(10) Patent No.: US 9,718,415 B2
(45) Date of Patent: Aug. 1, 2017

(54) VEHICLE-MOUNTED INTEGRATED HOUSING AND REMOVABLE TOOL BOX SYSTEM

(71) Applicant: Robert Squicciarini, Hauppauge, NY (US)

(72) Inventor: Robert Squicciarini, Hauppauge, NY (US)

( * ) Notice: Subject to any disclaimer, the term of this patent is extended or adjusted under 35 U.S.C. 154(b) by 53 days.

(21) Appl. No.: 14/812,154

(22) Filed: Jul. 29, 2015

(65) Prior Publication Data

US 2016/0031383 A1    Feb. 4, 2016

Related U.S. Application Data

(60) Provisional application No. 62/030,166, filed on Jul. 29, 2014.

(51) Int. Cl.
*A45F 3/14* (2006.01)
*B60R 11/06* (2006.01)
*B60R 5/04* (2006.01)
*B60R 11/00* (2006.01)

(52) U.S. Cl.
CPC ............... *B60R 11/06* (2013.01); *B60R 5/04* (2013.01); *B60R 2011/0036* (2013.01)

(58) Field of Classification Search
CPC .................................. B60R 5/04; B60R 11/06
USPC ........................................................ 224/281
See application file for complete search history.

(56) References Cited

U.S. PATENT DOCUMENTS

| | | | |
|---|---|---|---|
| 4,531,774 A | 7/1985 | Whatley | |
| 5,419,470 A | 5/1995 | Jackson | |
| 5,615,922 A | 4/1997 | Blanchard | |
| 5,947,356 A | 9/1999 | Delong | |
| 5,964,492 A * | 10/1999 | Lyon | B60R 9/00 224/404 |
| 6,033,002 A | 3/2000 | Clare | |
| 6,422,629 B2 * | 7/2002 | Lance | B60R 11/06 224/403 |
| 6,464,277 B2 | 10/2002 | Wilding | |
| 6,571,949 B2 | 6/2003 | Burrus | |
| 6,695,375 B1 | 2/2004 | May | |
| 6,932,406 B2 | 8/2005 | Waye | |
| 7,052,066 B2 * | 5/2006 | Emery | B60R 11/06 296/37.1 |

(Continued)

*Primary Examiner* — Derek Battisti
(74) *Attorney, Agent, or Firm* — Thomas A. O'Rourke; Bodner & O'Rourke, LLP

(57) ABSTRACT

A tool box housing is configured to be removably installed upon a combination rail system and mounting board, which itself is configured to mount within the cargo area of a vehicle, such as an SUV or pickup truck. The tool box housing and rail system with mounting board are configured to provide a separate, readily accessible and protected storage area for electrical units, or other items, which may be conveniently accessed using trays that slide relative to the tool box housing. The tool box housing is configured to mount to the rail system using quick release fasteners/receptacles or convention bolt/nut pairs, so that the tool box housing may quickly/easily be removed and interchangeably replaced with a flat floorboard housing, which protects the rails when the tool box housing is not utilized, and furthermore restores the floor of the vehicle to a more storage friendly state for transporting larger items.

16 Claims, 11 Drawing Sheets

(56) References Cited

U.S. PATENT DOCUMENTS

| | | | |
|---|---|---|---|
| 7,401,716 B2* | 7/2008 | Svenson | B60R 5/045 |
| | | | 224/42.32 |
| 7,530,618 B2* | 5/2009 | Collins | B60P 1/003 |
| | | | 224/403 |
| 7,726,719 B1 | 6/2010 | Barron | |
| 8,205,926 B2* | 6/2012 | Beckley | B60R 5/04 |
| | | | 296/37.14 |
| 8,281,967 B2* | 10/2012 | Evans | B60R 9/00 |
| | | | 224/404 |
| 8,393,665 B2 | 3/2013 | Villano | |
| 8,668,209 B1 | 3/2014 | Anzivino | |
| 8,905,276 B2* | 12/2014 | Bernert | B60R 5/04 |
| | | | 224/281 |
| 2002/0014505 A1* | 2/2002 | Lance | B60P 3/14 |
| | | | 224/404 |
| 2002/0034430 A1* | 3/2002 | Sotiroff | B60J 5/047 |
| | | | 414/462 |
| 2006/0061116 A1* | 3/2006 | Haaberg | B60P 3/14 |
| | | | 296/37.6 |

\* cited by examiner

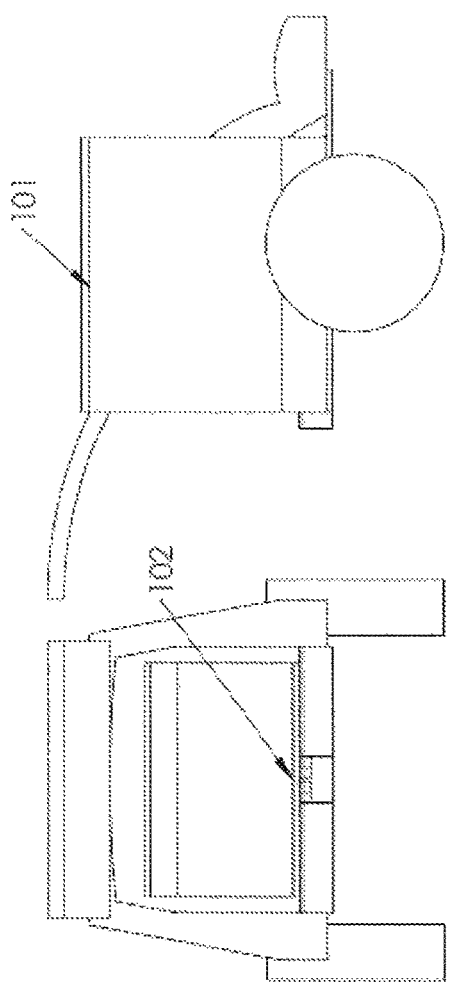
FIG. 1A
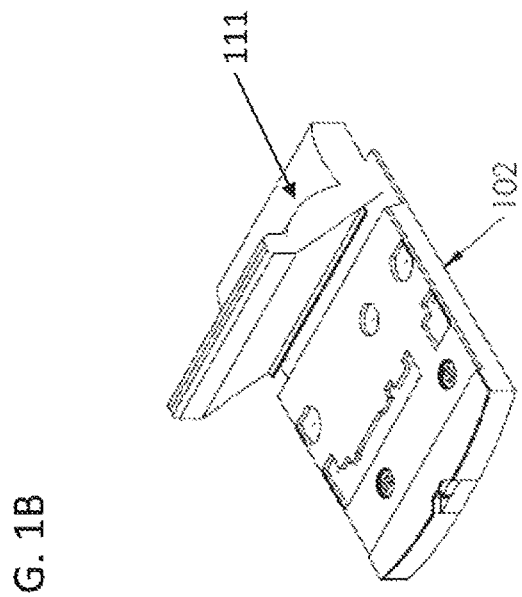
FIG. 1B
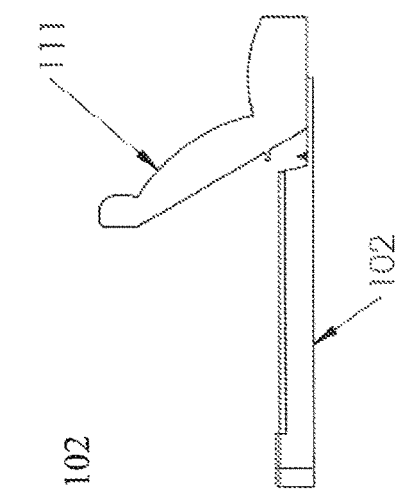
FIG. 1E
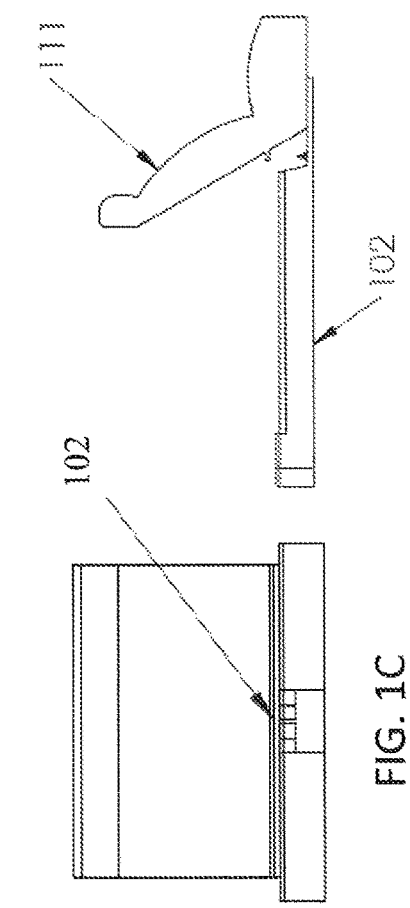
FIG. 1C
FIG. 1D

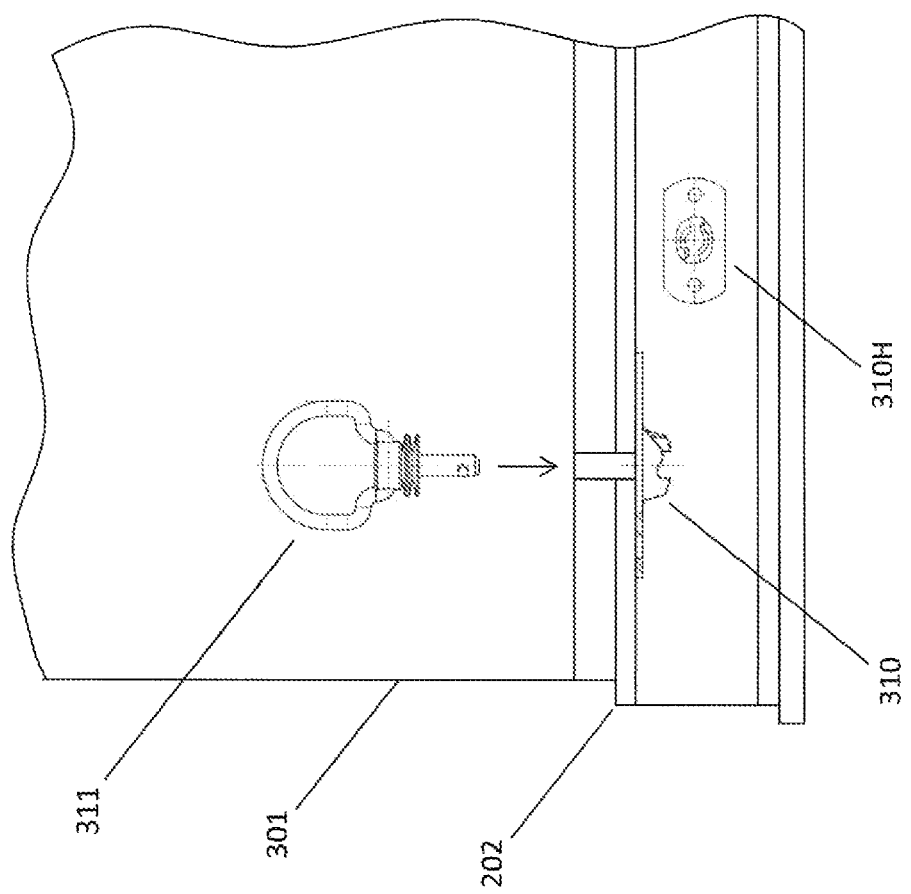

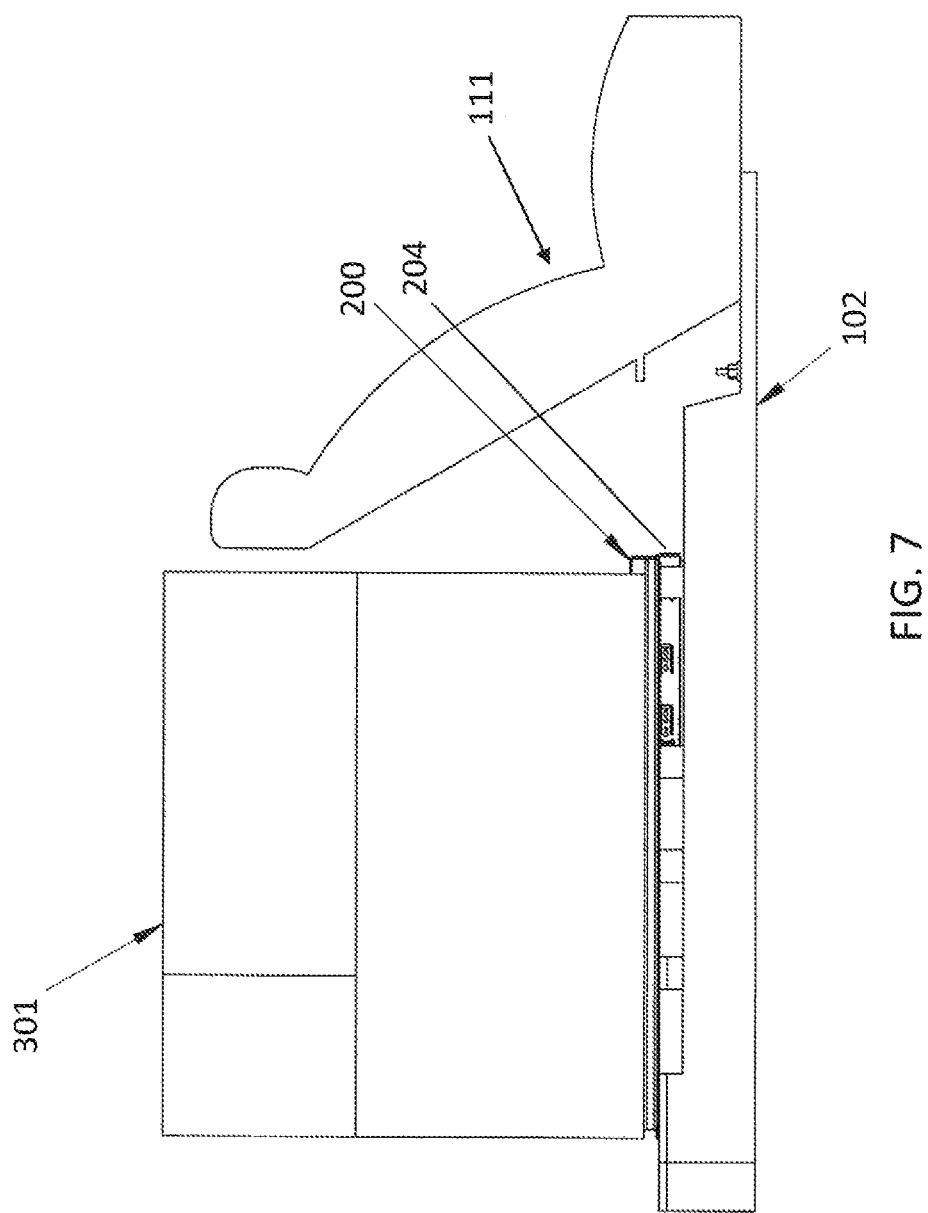

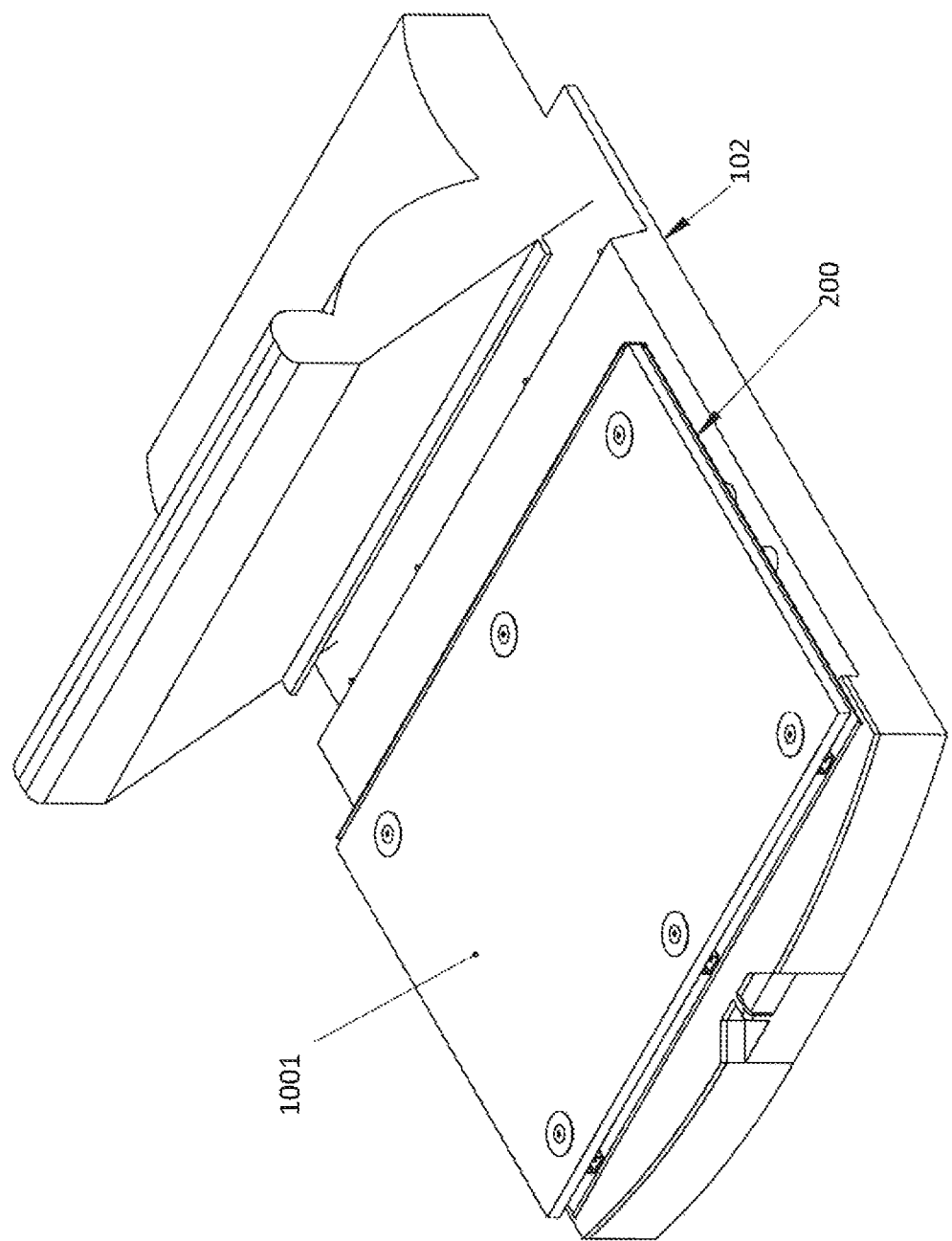

VEHICLE-MOUNTED INTEGRATED HOUSING AND REMOVABLE TOOL BOX SYSTEM

CROSS REFERENCE TO RELATED APPLICATIONS

This application claims priority on U.S. Provisional Application Ser. No. 62/030,166, filed on Jul. 29, 2014, the disclosures of which are incorporated herein by reference.

FIELD OF THE INVENTION

The present invention relates to a toolbox transport system to be mounted in a vehicle, such as a sport utility vehicle or a pickup truck, having a truck bed or carrying space area, and more particularly to an integrated housing system which is part of the support structure of the toolbox carrying system.

BACKGROUND OF THE INVENTION

Vehicles, such as pickup trucks, and sports utility vehicles have long been used as transport and storage, and as a means of access for tools, materials and devices used in various professional trades and for emergency/rescue work.

Various designs of tool carriers are known in the art. Often these carriers are configured to provide a workspace, or to carry a variety of tools, or to assist in making the tools carried in a vehicle more accessible, more safely stored, or more adequately securable.

Related art includes: U.S. Pat. No. 5,615,922 to Blanchard which presents fixed mounted storage boxes which are accessible from the exterior of the truck by means of truck modifications to the vehicle sides and sidewalls; U.S. Pat. No. 8,393,665 to Villano which presents a motorized system for elevating a tool box from its riding position to an more easily accessible position at the destination site; U.S. Patent App. Pub. No. 2006/0061116 by Haaberg which presents a utility table and storage apparatus for ease of access and use and workspace at the storage site; U.S. Pat. No. 6,033,002 to Clare which presents a collapsible material carrier and hidden storage system to mask the storage capability and reduce chances of theft; and U.S. Pat. No. 5,419,470 to Jackson which presents space for a plurality of individual tool carriers contained within a rectangular housing shed installed in the truck.

The prior art use of the phrase "tool box" ranges from a hold in the hand box to a large storage container beyond the strength of one individual to move. The Applicant uses the phrase "tool box" or "command box" interchangeably herein, and as such identifies three entities found within the following description: (1) a tool box housing, (2) a tool box assembly, and (3) the carrying space area.

The tool box housing is a structure configured to provide one or more partitioned storage areas that may be used for storing of tools and other items, which may include electrical equipment.

The tool box assembly is defined to mean an assembly of a mounting rail system with mounting board, or equivalent, and either the tool box housing or a floorboard platform. The mounting rail system with mounting board may be configured to permit easy and interchangeable installation of either the tool box housing or the floorboard platform into the cargo area of a vehicle.

The Tool Box Assembly of the present invention is configured to be installed within the carrying space area of a vehicle, which is defined to be the volumetric area available for storage in the vehicle, which may also be referred to as its cargo area. In a Sports Utility Vehicle, for example, it would be approximated by the area behind the rear seat. In a pickup truck it would be approximated by the truck bed area.

SUMMARY OF THE INVENTION

It is the object of the present invention to provide a removable Tool Box Assembly which mounts with the Tool Box Housing in a manner which provides for a separate protected storage area for electronic assemblies and/or other items or materials.

It is a further object of the present invention to provide a removable Tool Box Assembly which mounts with the Tool Box Housing in a manner which provides for a separate protected storage area for electronic assemblies, or other items or materials, and rails to enable the electronic assemblies to be easily installed and removed.

It is a further object of the present invention to provide a removable Tool Box Assembly which mounts with the Tool Box Housing in a manner which provides for a separate protected storage area for electronic assemblies, or other items or materials, with distributed power and air cooling and handling.

It is a further object of the present invention to provide a floorboard housing platform which may be interchanged with the Tool Box Housing, for restoring the vehicle Carrying Space Area to a standard storage usage state.

BRIEF DESCRIPTION OF THE DRAWINGS

The features and advantages of the present invention will become apparent to those skilled in the art from the following description with reference to the drawings, in which:

FIG. 1A and FIG. 1B respectively show rear and side views of a vehicle within which the present invention may be utilized, and the mounting platform contained within the Carrying Space Area of the vehicle.

FIGS. 1C, 1D, and 1E respectively show a rear, a side, and a perspective view of the mounting platform within the vehicle of FIGS. 1A and 1B.

FIG. 6A shows a section cut through the quick-release mounting arrangement for mounting of the Tool Box Housing to the rails of the rail system.

FIG. 7 shows a side view of the installed tool box housing and rail system with mounting board, as seen in FIG. 6.

FIG. 10 depicts a floorboard housing platform mounted in the vehicle Carrying Space Area, instead of the Tool Box Housing, and is mounted using the same rails as was used for mounting of Tool Box Housing.

DETAILED DESCRIPTION OF THE INVENTION

Figure 2:
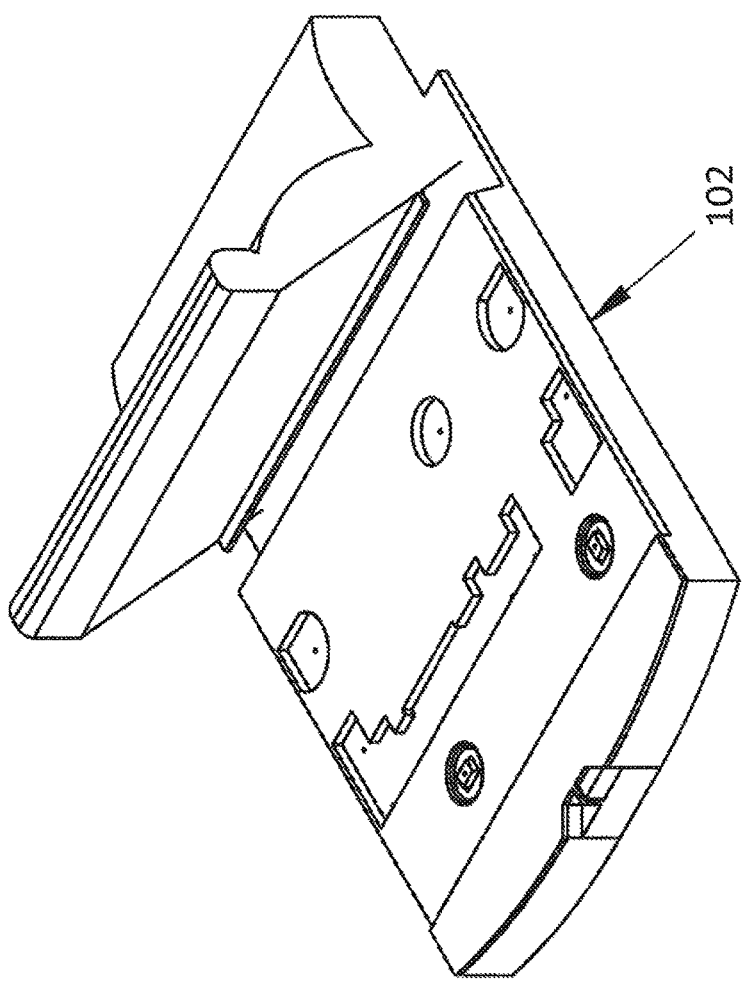
FIG. 2 depicts an enlarged copy of the perspective view of the mounting board of the vehicle, as seen in FIG. 1E.

To better appreciate the present invention, some deficiencies with the prior art are discussed, and which are overcome through the use of the present invention.

Present day operations in most business and organizational activities integrate the operations of electronics into business and organizational practice. Communications and computing power are ubiquitous. Yet even the wide range of tool box systems currently available fail to provide any special housing for electronics or electronic assemblies. At best they simply provide for re-charging of power tools.

One major aspect of the present invention is an integrated housing approach where the Tool Box Housing incorporates easy access for electronic assemblies, or other type of assemblies, independent of whether the Tool Box Assembly is installed.

The inventor notes that one aspect of the present invention is that the space provided for the electronics assemblies from the tool box assembly does not reduce the aggregate space available in the vehicle. This space has been reclaimed from what otherwise would have been un-used space. The reclaimed un-used space is a byproduct of the geometries of the vehicle Carrying Space Area, the tool box housing, and the use of sliding rails of the rail system, which, by convention, are both parallel and straight. However, there is nothing in this invention which prevents raising the mounting board to afford even more space to the electronic assemblies, however, the volume of unusable space available in this example was judged entirely sufficient to provide adequate room for electronic assemblies.

The inventor notes that another aspect of the present invention is that the space available for electronics has been designed into the housing, which provides space that is protected, free from obstruction, protected from water, and accommodates additional sets of one or more rails to easily mount and un-mount additional electronic assemblies. In addition this integrated space could optionally provide power distribution and air cooling, capabilities—depending on the type and nature of the electronic assemblies to be installed. Those skilled in the art recognize that a variety of plenum connections for air cooling and power distribution could be fitted for the purpose of distributing the vehicle's power and air cooling capabilities.

The vehicle used as an example in this specification is a Chevy Tahoe, but this is only used as a practical example, and those skilled in the art will recognize that the present invention may similarly be installed within other sports utility vehicles and pickup trucks as well.

FIGS. 1A-1E show different aspects of a Chevy Tahoe. These figures show the front and side views of the vehicle itself and the mounting platform contained with the storage area of the vehicle. In FIG. 1B the vehicle chassis 101 is shown as including an embedded vehicle mounting platform 102. FIG. 1A and FIG. 1D show the location of this mounting platform 102, as being behind the retractable seat 111.

Figure 3:
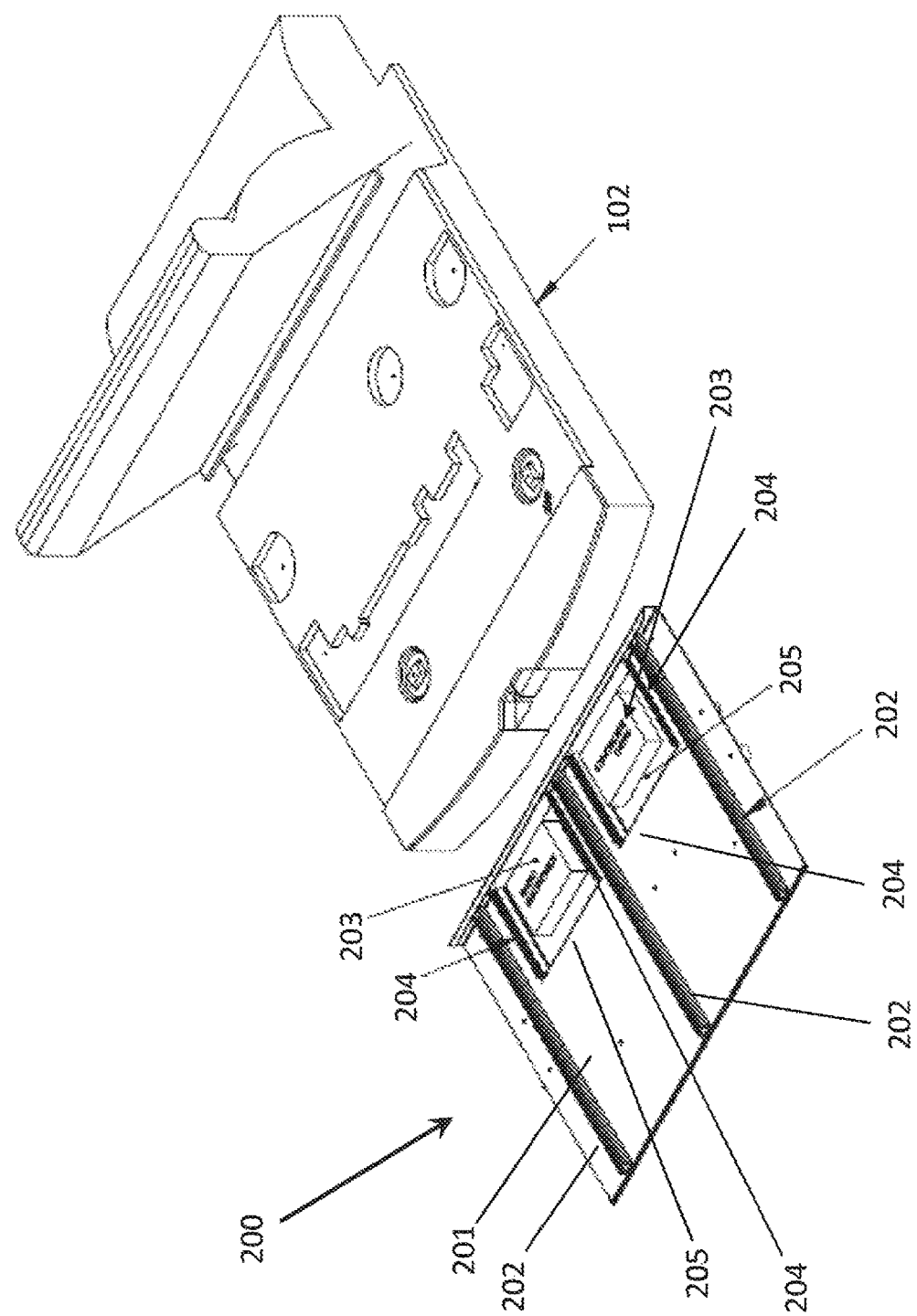
FIG. 3 depicts a view of the vehicle mounting board of FIG. 2, and a Tool Box rail system and mounting board of the present invention, prior to installation in the vehicle.

FIG. 3 shows the vehicle mounting platform 102 together with an uninstalled rail system and mounting board assembly 200 of the present invention. Note that the rail system and mounting board assembly 200 may have mounting hardware holes which may be positioned on the board 201 to correspond to hole locations of the embedded mounting platform 102.

The rail system and mounting board assembly 200 includes rails 202 for the purpose of mounting the Tool Box Housing thereto. The rails may be fixedly secured to the board 201. The rail system and mounting board assembly 200 also includes: a smaller sets of rails 204 for the purpose of mounting the electronics assembly; a tray 205 that slides into the rails 204 for receiving the electronics assembly 203 therein. The example shown in FIG. 3 shows two electronic assemblies 203. The practice of this invention does not require any specific number of electronic assemblies, or even that this housing area be required to house electronics. Instead, this tray 205 could alternatively be used as a secured mounting location for a small firearm or weapon that would be independent of the tool box.

FIG. 2 depicts an enlarged view of the mounting platform 102 found with the cargo area of the vehicle. The enlarged view shows the detail and cutouts of the mounting platform. As may be seen from FIG. 3, the rail system and mounting board 200 may preferably incorporate a physical design which may conform to the vehicle mounting platform 102. A preferred aspect of the present invention is that the tool box be level, although some skilled in the art might choose other embodiments. Also, a preferred aspect of the present invention is that the tool box housing may embody the maximum volume of the vehicle's Carrying Space Area, as this will aid marketing approaches. However, nothing in this description limits the present invention to a particular size.

Figure 4:
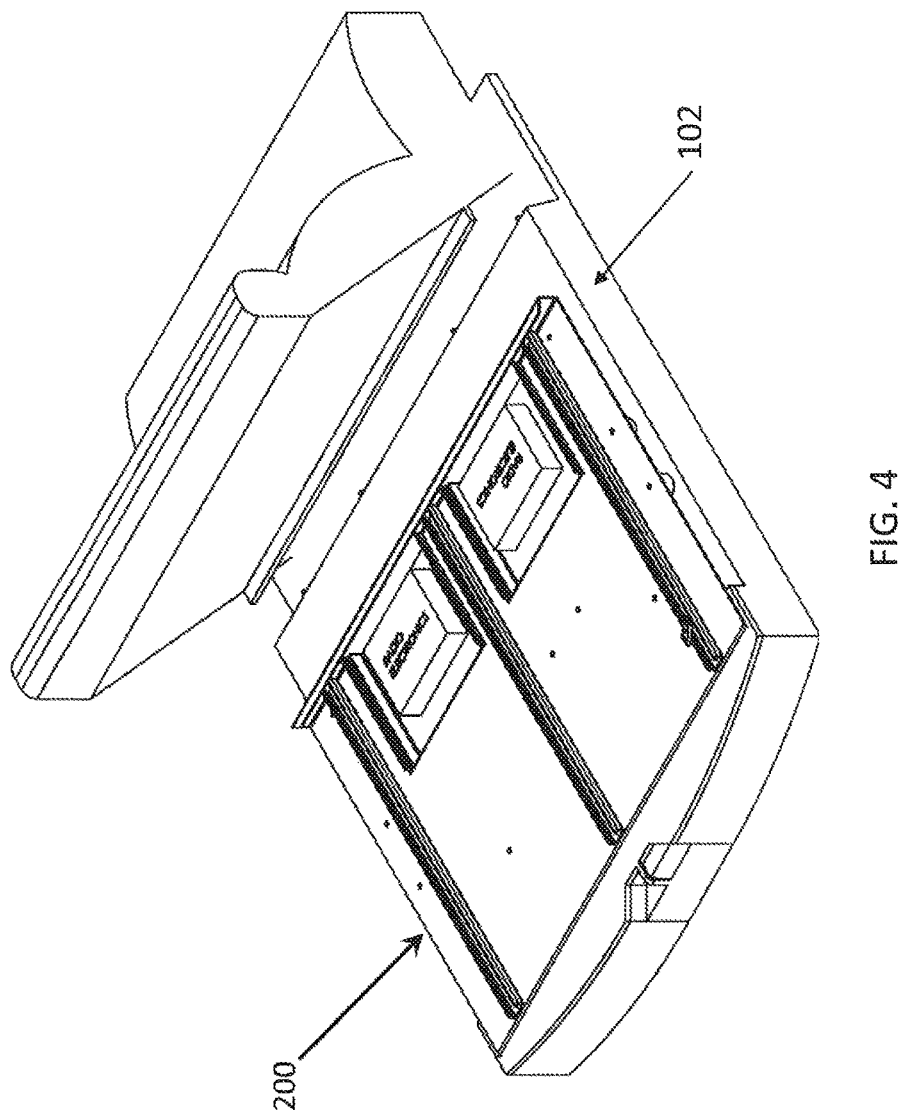
FIG. 4 shows the Tool Box Housing rail system and mounting board of the present invention, after being installed within the vehicle.

FIG. 4 shows a rail system and mounting board 200 of the present invention installed on the vehicle's mounting platform 102. Once the rail system and mounting board 200 is installed, it is possible to mount the Tool Box Housing thereto.

Figure 5:
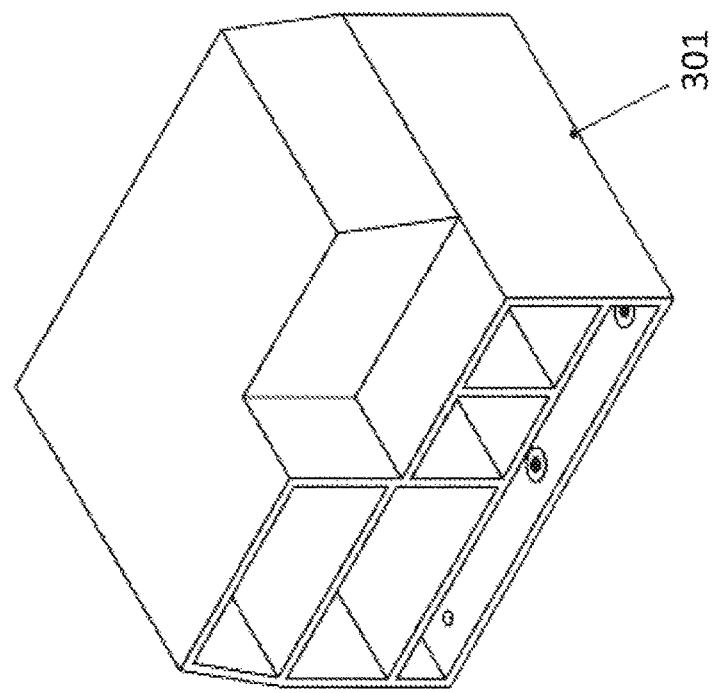
FIG. 5 is a perspective view of a Tool Box Housing of the present invention.
Figure 5A:
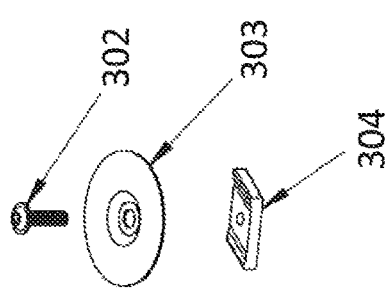
FIG. 5A is a perspective view of mounting hardware usable for mounting of the Tool Box Housing of FIG. 5 to the rails of the rail system, within the vehicle of FIG. 1A.

FIG. 5 illustrates an embodiment of a Tool Box Housing of the present invention, and FIG. 5A shows associated mounting hardware. The screw/bolt 302, washer 303, and nut 304 are shown for illustrative purposes, as this hardware may be used to secure a bottom portion of the tool box housing to the rails of the rail system and mounting board 200. Alternatively, instead of nut/bolt combination, a quarter-turn quick release fastener and receptacle combination may be used to secure the tool box housing to the rail system, including, but not limited to the quick release fastener shown by U.S. Pat. No. 3,896,698 to Aylott; U.S. Pat. No. 4,619,569 Wright; and publication EP 001191 by Gunther. FIG. 6A shows a receptacle 310, which may be fixedly secured to one of the flanges of the rail 202 (e.g., using rivets), and which may be configured to receive a D-ring, quarter-turn, quick-release camloc fastener 311 to releasably secure the tool box housing 310 to the rail. The interior of the tool box housing at the fastener location may be counter-bored to permit the D-ring to be folded over and lie flush below the bottom surface of the tool box, without protruding into the tool box space. Each of the rails 202 may similarly have as receptacle 310H fixedly secured thereon, which may receive horizontally disposed D-ring, quarter-turn, quick-release camloc fastener 311 therethrough which may be used to prevent relative movement of the rails members. When desired the pins through the three receptacles 310H may be removed to permit relative movement of the rails 202, so that the tool box housing may slide rearward out from the back of the vehicle, which may provide access to partitioned openings in the sides of the box. The Tool Box Housing 301 is shown in FIG. 5 as having several compartments, but the number, shape, and size of such compartments may vary, while nonetheless permitting the assembly to be installed in accordance with the teachings of the present invention.

Figure 6:
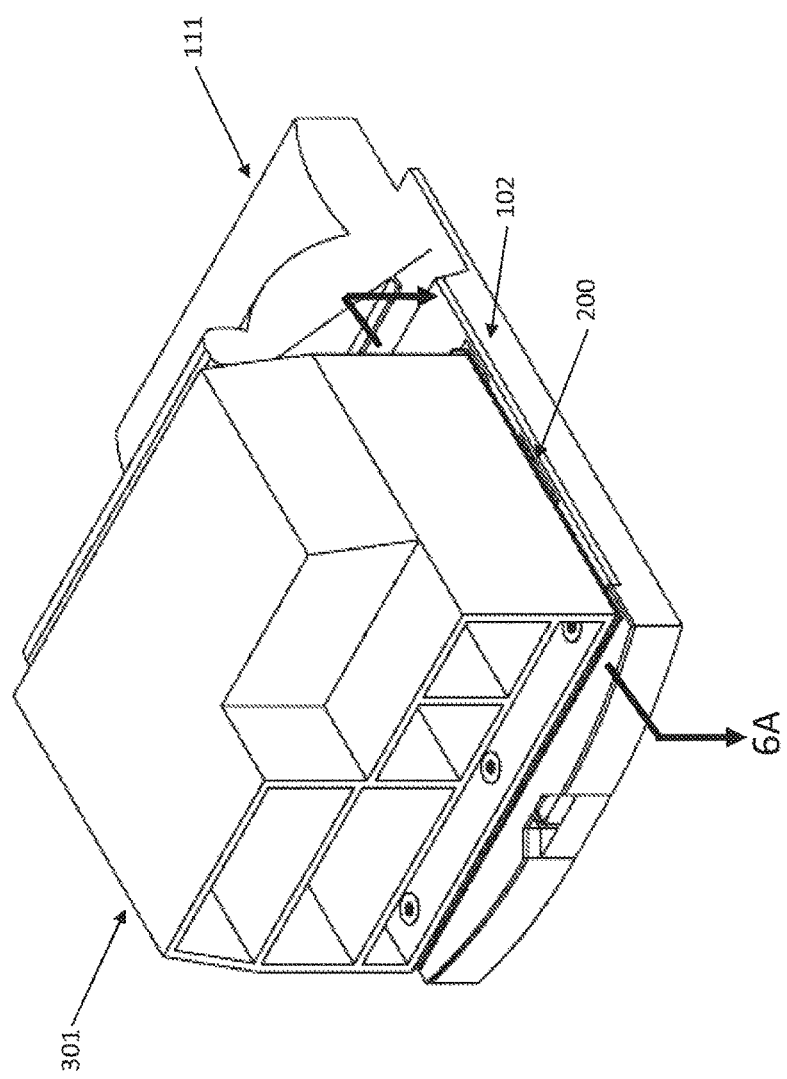
FIG. 6 shows the tool box housing of FIG. 5 mated together with the rail system and mounting board, as seen in FIG. 4 which had already been installed in the vehicle.

FIG. 6 shows the Tool Box Housing 301 mated together with the rail system and mounting board assembly 200, which was installed upon the mounting platform 102 of the vehicle. In this example the size of the Tool Box Housing 301 takes up the majority of the vehicle Carrying Space Area from the back of the retractable car seat 111 to the end of the mounting platform 102. The size of the Tool Box housing 301 may vary for the practice of this invention. The Tool Box Housing 301 mated together with a rail system and mounting board assembly 200, as installed upon the mounting platform 102 of the vehicle creates one aspect of the Integrated Tool Box System of the present invention.

FIG. 7 shows a side view of a tool box housing mated together with the rail system and mounting board, after being installed upon the mounting platform of the vehicle. The beginning of the electronics rails 204 are labeled in this view and the electronics units are shown slid into (retracted within) the integrated housing.

Figure 8:
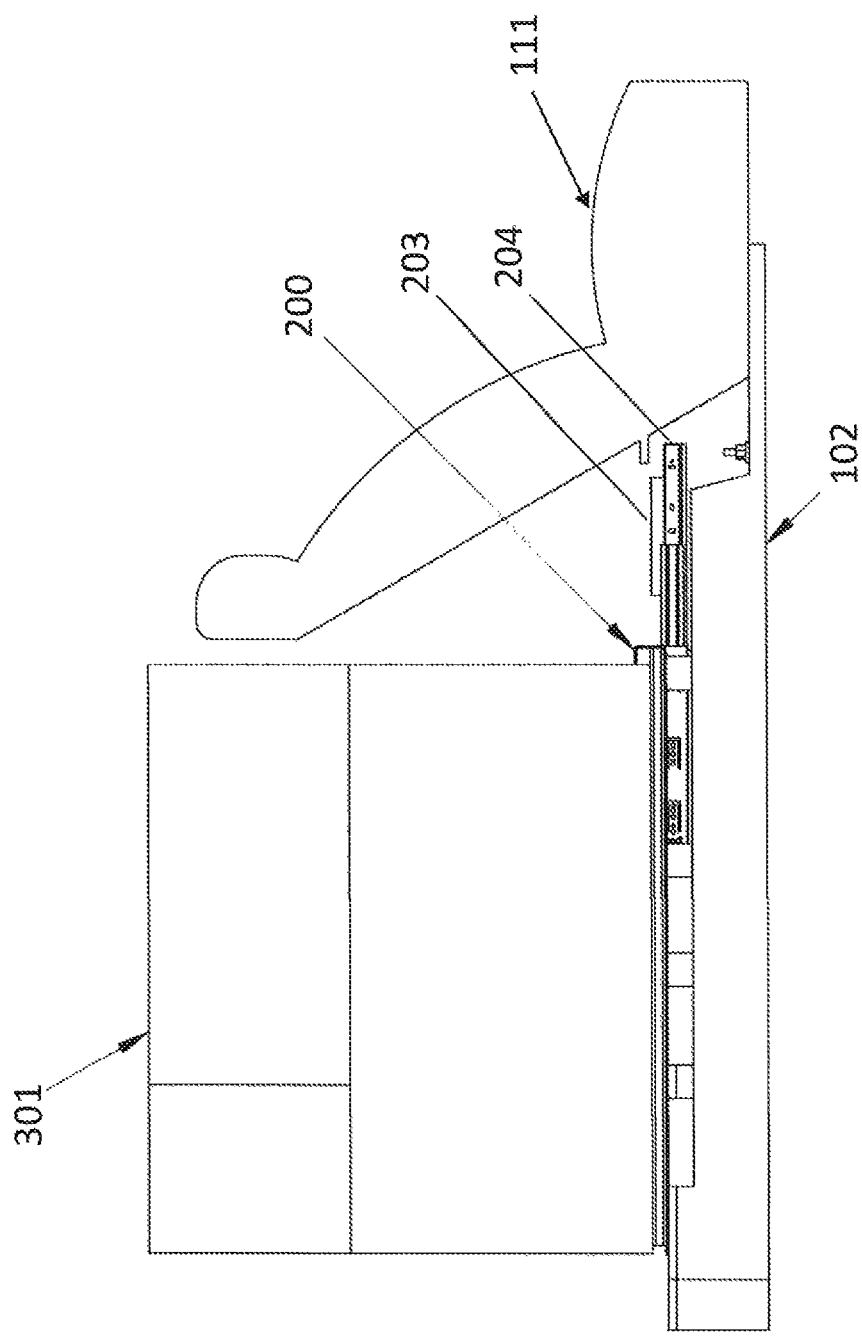
FIG. 8 shows the side view of FIG. 7, but is shown with an electronics board extended using a rail of the present invention.

FIG. 8 show the side view of the Tool Box Housing 301 mated together with the rail system and mounting board assembly 200, as seen in FIG. 8, but has the electronics boards 203 extended outwardly using rails 204. This extended positioning permits easy replacement and servicing of the electronics assemblies. Note that retractable seat 111 is shown in the upright position, however for easier access it is anticipated that the user may move the seat away from the integrated housing.

Figure 9:
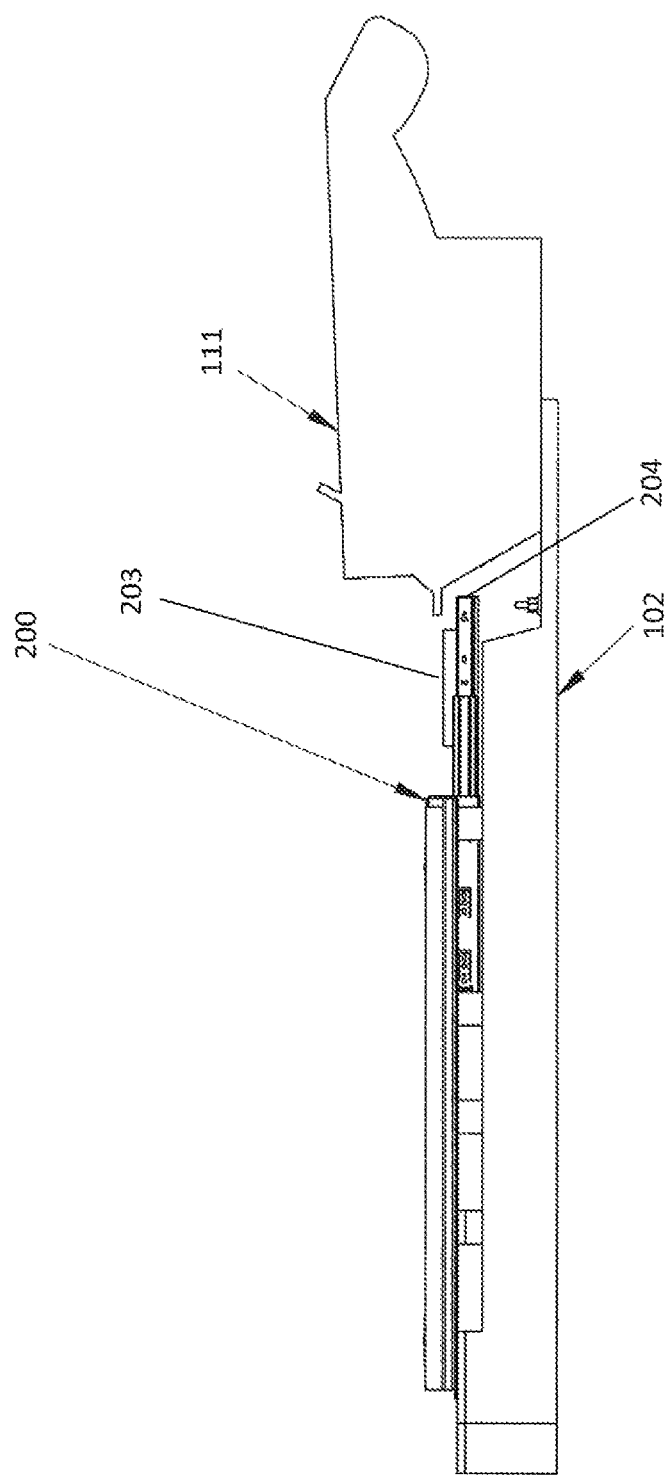
FIG. 9 is the side view of FIG. 8, but shown with the seat of the vehicle pivoted into a forward extending position.

FIG. 9 shows a view of the electronics assembly on its rails extended outwardly from the integrated housing. This view also shows the vehicle seat pivoted forward for convenience. This view illustrates that the electronics area of the Tool Box Housing unit affords easy and quick access to the electronics area.

FIG. 10 depicts a floorboard housing platform 1001 that may alternatively be mounted in the vehicle Carrying Space Area instead of the Tool Box Housing, and which may use the same rails as the Tool Box Housing. This floorboard housing platform 1001 serves two purposes. First it protects the mounting rails during vehicle usage when the Tool Box Housing 301 is not utilized. Second, it restores the floor of the vehicle to a storage friendly state. Those skilled in the art will recognize that to variety of anchor points, or equivalent, could be positioned in this platform to assist in carrying materials or cargo.

Nothing in this specification should be understood to limit this invention mounting in a specific vehicle or type of vehicles or even vehicles themselves. The example vehicle is merely an example of a convenient unit. The principles of this invention might be applied to mounting a Tool Box Assembly in a manned aircraft, helicopter, or an unmanned drone.

Likewise nothing in this specification should be understood to limit this invention to a Tool Box Assembly comprised of a particular number, arrangement or use of compartments. The Tool Box Assembly size compartment arrangement should reflect the need of the particular user community.

Likewise nothing in this specification should be understood to limit this invention to housing electronic assemblies in the integrated housing. The present invention would work with assemblies which may be fully chemical in nature—perhaps a chemical sniffer alarm of some type—or some other means and that the number and type of assembly is not intended to be specified in this invention.

In summary, the present invention presents at apparatus and method to provide a removable Tool Box Housing which mounts with a rail system and mounting board, which itself is mounted in a vehicle such as a sport utility or pickup truck. The manner which Tool Box Housing mounts within the vehicle provides a separate readily accessible protected storage area for assemblies such as electrical units or other items or materials.

The invention claimed is:

1. A mounting system for slidably mounting a tool box housing within a cargo area of a vehicle, and for slidably mounting a tray configured to receive an electronics assembly beneath the tool box housing to provide easy access thereto, said mounting system comprising:
   a mounting board, said mounting board comprising two or more mounting holes positioned to correspond to hole locations of a platform of the cargo area of the vehicle;
   a first rail comprising a first portion and a second portion, said first portion of said first rail fixedly secured to said mounting hoard at a first location;
   a second rail comprising a first portion and a second portion, a first portion of said second rail fixedly secured to said mounting board at a second location;
   a tool box housing;
   fastener means for releasably securing said tool box housing to said second portion of said first rail, and to said second portion of said second rail;
   wherein said second portion of said first rail and said second portion of said second rail are configured to slide relative to said first portions of said first and second rails, respectively, to permit said tool box housing to slide out from the cargo area of the vehicle;
   a tray;
   a third rail comprising a first portion and a second portion, said first portion of said third rail fixedly secured to said mounting board at a third location, said third location being between said first location and said second location;
   a fourth rail comprising a first portion and a second portion, said first portion of said fourth rail fixedly secured to said mounting board at a fourth location, said fourth location being between said first location and said third location;
   fastener means for releasably securing said tray to said second portion of said third rail, and to said second portion of said fourth rail;
   wherein said second portion of each of said third and fourth rails are configured to slidably support said tray in a recessed region below said tool box housing.

2. The mounting system according to claim 1 wherein said second portions of said first and second rails are configured to move in a first direction, and said second portions of said third and fourth rails are configured to move in a second direction, said first direction being different from said second direction.

3. The mounting system according to claim 2 wherein said first and second directions are opposite directions, with said first direction being out from a rear of the vehicle, and said second direction being toward a front of the vehicle.

4. The mounting system according to claim 3 wherein said second portions of said third and fourth rails being configured for said tray to slide toward the front of the vehicle are thereby configured for said tray to slide to provide access to the electronics assembly.

5. The mounting system according to claim 4 further comprising means for releasably inhibiting said slidable movement of said second portion relative to said first portion, for each of said first and second rails.

6. The mounting system according to claim 5 further comprising means for releasably inhibiting said slidable movement of said second portion relative to said first portion, for each of said third and fourth rails.

7. The mounting system according to claim 6 wherein said mounting board comprises a periphery configured to correspond to the platform of the cargo area of the vehicle.

8. The mounting system according to claim 7 wherein said tool box housing is configured to occupy substantially an entire volume of the cargo area of the vehicle.

9. A vehicle mounting system comprising:
a mounting board comprising two or more mounting holes;
a first rail comprising a first portion and a second portion, said first portion of said first rail fixedly secured to said mounting board at a first location;
a second rail comprising a first portion and a second portion, a first portion of said second rail fixedly secured to said mounting hoard at a second location;
a tool box housing;
fastener means for securing said tool box housing to said second portion of said first rail, and to said second portion of said second rail;
wherein said second portion of said first rail and said second portion of said second rail are configured to slide relative to said first portions of said first and second rails, respectively, to permit said tool box housing to slide;
a tray configured to support an electronics assembly;
a third rail comprising a first portion and a second portion, said first portion of said third rail fixedly secured to said mounting board at a third location, said third location being between said first location and said second location;
a fourth rail comprising a first portion and a second portion, said first portion of said fourth rail fixedly secured to said mounting board at a fourth location, said fourth location being between said first location and said third location;
fastener means for securing said tray to said second portion of each of said third and fourth rails;
wherein said second portion of each of said third and fourth rails are configured to slidably support said tray in a recessed region below said tool box housing to provide easy access thereto.

10. The mounting system according to claim 9 wherein said second portions of said first and second rails are configured to move in a first direction, and said second portions of said third and fourth rails are configured to move in a second direction, said first direction being different from said second direction.

11. The mounting system according to claim 10 wherein said first and second directions are opposite directions, with said first direction being out from a rear of the vehicle, and said second direction being toward a front of the vehicle.

12. The mounting system according to claim 11 wherein said second portions of said third and fourth rails being configured for said tray to slide toward the front of the vehicle are thereby configured for said tray to slide to provide access to the electronics assembly.

13. The mounting system according to claim 9 further comprising means for releasably inhibiting said slidable movement of said second rail portion relative to said first rail portion, for each of said first and second rails.

14. The mounting system according to claim 9 further comprising means for releasably inhibiting said slidable movement of said second portion relative to said first portion, for each of said third and fourth rails.

15. The mounting system according to claim 9 wherein said mounting board comprises a periphery configured to correspond to the platform of the cargo area of the vehicle.

16. The mounting system according to claim 9 wherein said tool box housing is configured to occupy substantially an entire volume of the cargo area of the vehicle.

\* \* \* \* \*